United States Patent [19]
Kahn

[11] 3,796,999
[45] Mar. 12, 1974

[54] LOCALLY ERASABLE THERMO-OPTIC SMECTIC LIQUID CRYSTAL STORAGE DISPLAYS

[75] Inventor: Frederic Jay Kahn, Stirling, N.J.

[73] Assignee: Bell Telephone Laboratories, Incorporated, Murray Hill, Berkeley Heights, N.J.

[22] Filed: Oct. 19, 1972

[21] Appl. No.: 299,077

[52] U.S. Cl. ........ 340/173 R, 346/76 L, 350/160 R, 340/173 LM, 340/173 LS
[51] Int. Cl. ............................................. G11c 13/04
[58] Field of Search .....346/76 R, 76 L; 350/160 R, 350/160 P; 340/173 CL, 173 CC, 173 LM

[56] References Cited
UNITED STATES PATENTS
3,655,269   4/1972   Halmeier .................... 340/173 LM OTHER PUBLICATIONS
"Now That the Heat is Off, Liquid Crystals Can Show Their Colors" Joseph Castellano Electronics July 6, 1970 pages 64–70

*Primary Examiner*—Terrell W. Fears
*Attorney, Agent, or Firm*—D. I. Caplan

[57] ABSTRACT

This invention provides a liquid crystal optical display apparatus, which can be both selectively written and selectively erased. Both write-in and erase steps involve the use of localized thermal heating, by means of an infrared laser for example. The localized "written" state of the liquid crystal is characterized by a significantly greater optical scattering than the localized "erased" state of the crystal. Depending upon the conditions under which a localized area of the liquid crystal is cooled, the final state of the local heat-treated area becomes the non-scattering erase state or the scattering written state, thus affording localized erase or write-in, as desired. The factors which determine this final state (scattering vs. non-scattering) include the rate of cooling. In turn, the rate of cooling can be controlled by the rate of laser scan or by the cross section of the laser beam used for the heating of the selected areas of the liquid crystal. Additionally, the final state can be affected by the presence or absence of applied fields across the liquid crystal during the cooling period.

10 Claims, 2 Drawing Figures 3,796,999

LOCALLY ERASABLE THERMO-OPTIC SMECTIC LIQUID CRYSTAL STORAGE DISPLAYS

FIELD OF THE INVENTION

This invention relates to optical storage and display devices and more particularly to liquid crystal devices capable of storing and displaying information.

BACKGROUND OF THE INVENTION

In the prior art, it is known that there are liquid crystals whose optical properties can be modified by heat treatment ("thermo-optic"). These liquid crystals can be utilized in devices for storage of large quantities of information, particularly for optical display purposes. It is also known that certain liquid crystals at suitable ambient temperatures can support domains or regions in two or more different states of optical scattering. Thus, upon illumination of these liquid crystals with a visible light source, different domains of the crystal can transmit different intensities of light in a given direction. Thus, to an optical detector, such as the human eye, different regions of the liquid crystal can differ in their apparant brightness. These regions can be controlled, as to their contours, by means of various "write-in" techniques, such as thermal write-in with a laser beam. However, in the prior art, localized selective erase of the liquid crystal subsequent to write-in has not been implemented. It would, therefore, be desirable to have a liquid crystal display device with a localized erase capability, in order to afford selective erase capability without the need for rewriting the entire device to modify selected portions of the display (i.e. "updating").

SUMMARY OF THE INVENTION

A liquid crystal, advantageously having a smectic type of ordered state at the ambient operating temperature, is selectively locally heated advantageously to the nematic or to the isotropic state, by means of a localized write-in beam, typically a steerable laser beam. As used herein, the term "smectic liquid crystal" refers to a liquid crystal in which (except for thermal and other fluctuations) the centers of gravity of the molecules are situated in mutually parallel planes characterized in that the molecules within a given plane are aligned with their long axes mutually parallel. Similarly, the term "nematic" refers to a liquid crystal in which the centers of gravity of the molecules are randomly distributed, on a long-range basis, with their long axes aligned mutually parallel. The term "isotropic" refers to the absence of any long-range order between the molecules, i.e., neither mutual orientation of long axes nor locations of centers of gravity. After the selected regions of the liquid crystal are thereby heated by the beams, typically on different occasions, the crystal is allowed to cool back to the original ambient temperature at different effective rates on the different occasions. These different effective rates of cooling can be achieved either by using different scanning rates, and/or by using different cross sections for the scanning beam, and/or by applying different electrical fields during heating and cooling periods. In this way, the liquid crystal, upon which the beam has been selectively incident, will be brought into a corresponding pattern of final states of differing types of molecular ordering, by reason of the controlled heating and cooling. These different molecular orderings produce different optical scattering properties ("textures") in the corresponding portions of the crystal. Thereby, these different portions of the liquid crystal can be written in with a pattern of information. Thereafter, this pattern can be selectively erased by means of further scanning in conjunction with a different effective cooling rate.

In a specific embodiment of this invention, a smectic liquid crystal, such as N-(p-cyanobenzylidene)-p-n octylaniline ("CBOA") in the form of a thin layer, is sandwiched between two visibly transparent, but infrared absorbing, electrode layers. The CBOA is heated either to the isotropic or to the nematic state and then cooled slowly back to the smectic state, in order to produce a non-scattering smectic texture over the entire layer (uniform "erase" or "clean slate"). Thereafter, a write-in infrared laser beam is allowed to scan selectively the liquid crystal at those portions thereof at which it is desired to write in a pattern of information. Advantageously, the write-in beam temporarily heats the crystal selectively into the isotropic state. In this way, a stored pattern of disordered (optically scattering) smectic regions is formed in the otherwise ordered (nonscattering) crystal, in accordance with the pattern of the selective write-in laser scan. Furthermore, this pattern of information can then be selectively erased, by means of a second selective scan with the same (or another laser) beam, having a scanning rate, cross section, and an optical intensity such that the rate of cooling is sufficiently slower than the cooling rate immediately subsequent to the first (write-in) scan. This erasing beam is advantageously sufficient to produce temporarily either the nematic or the isotropic state, locally. This second (erase) scan produces again the ordered (optically nonscattering) smectic texture at those portions of the crystal to be erased, i.e., at those portions which are selectively scanned by this second scanning beam. Thus, the nonscattering smectic texture is reproduced at these erased portions, which are therefore optically transparent in substantially the same degree as the unwritten portions of the liquid crystal.

The various stored patterns of molecularly ordered and disordered states can be read out at any time by means of external optical illumination, as furnished by an ordinary light bulb, for example, or by Schlieren optical techniques. Since the ordered regions of the liquid crystal produce significantly less optical scattering than the disordered regions thereof, an optical detector such as the human eye will observe the liquid crystal as impressed with a pattern of relatively bright and dark portions. The bright portions will be observed in those regions which are in the disordered state, that is, the optically scattering state; whereas, the relatively dark portions will be observed in those regions of the liquid crystal which are in the ordered state, that is, the optically transparent state (provided, of course, that the detector is located off to one side obliquely with respect to the illuminated liquid crystal).

If the period of time required for cooling into the molecularly ordered state (for the purpose of selective erasure) is undesirably large, this time may be significantly shortened by means of an applied electric field applied to the liquid crystal across the electrodes. Advantageously, this electric field is AC in order to minimize electro-chemical effects. Thus, the turning "on" of an electric field can convert the write-in beam into an erasing beam. Thereby, an optical display apparatus is provided in this invention which can be locally written in and locally erased within periods of time of the order of less than one millisecond per bit of information.

The optical readout intensity contrast ratios of patterns of information stored in smectic CBOA are typically at least 25 percent greater than the best ratios known to be obtained with cholesteric storage-type liquid crystals. In addition, the yield of thermooptic smectic devices, of useful quality for storage, has been found to be several times higher than the yield of other types of thermooptic liquid crystal storage devices, using the same degree of care in fabrication.

BRIEF DESCRIPTION OF THE DRAWING

This invention, together with its features, advantages and objects, can be better understood from the following detailed description when read in conjunction with the drawing in which.

DETAILED DESCRIPTION

Figure 2:
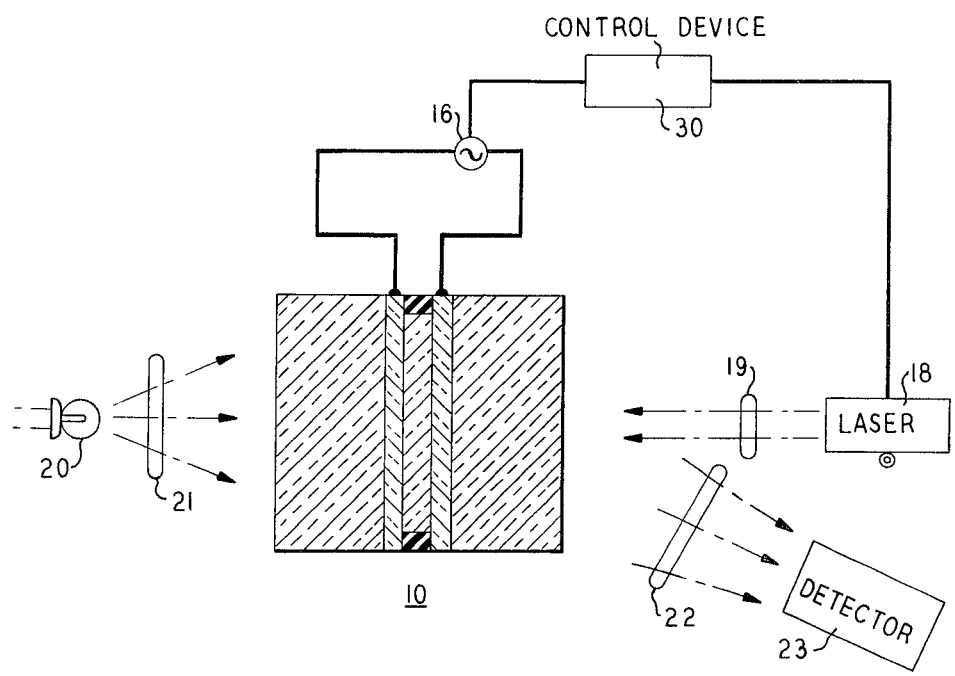
FIG. 2 is a diagram of an optical display apparatus according to another embodiment of this invention.

An optical display device 10 includes a liquid crystal layer 11 sandwiched between a pair of visibly transparent electrodes 12 and 13. Advantageously, one or both of these electrodes are absorbtive of infrared radiation. Typically, an annular polymeric spacer 11.1 maintains proper distances between electrodes for controlling the thickness of the liquid crystal 11. The electrodes are supported mechanically by means of transparent fused silica slabs 14 and 15, respectively. An AC voltage source 16 is connected through a switch 17 across the transparent electrodes 12 and 13. An infrared laser source 18, which can be steered by various means known in the art, provides a controlled scanning laser beam 19 incident upon the device 10; so that this beam 19 locally heats the electrodes 12 and 13, and hence locally heats the liquid crystal 11. A readout visible optical source 20 (or ambient stray light) provides a readout incident optical beam 21, which traverses the optical device 10 and is scattered by the various selected portions of the liquid crystal 11 to form an output optical wave 22. This output wave is incident upon the optical detector 23 (which can be the human eye) for utilization of the optical output wave. As indicated in FIG. 2, a control device 30 can be used to control simultaneously the laser source 18 and the AC voltage source 16, to apply both laser beam 19 and electric fields to the device 10.

EXAMPLE

The liquid crystal 11 is a layer of N-(p-cyanobenzylidene)-p-n octylaniline (CBOA), which is typically about 14 microns in thickness. This layer 11 is sandwiched between the two electrodes 12 and 13, which are both coated (at their common surfaces with the liquid crystal 11) with a silane coupling agent, such as N,N-dimethyl-N-octadecyl-3-aminopropyltrimethoxysilylchloride (Dow Corning XZ 2–2300). The coupling agent is typically applied from water solution and then cured by drying. Thereby a preferred direction is established in the liquid crystal 11 by means of the coupling agent. The electrodes 12 and 13 are typically made of indium-tin oxide layers having a thickness of about 0.5 to 1.0 micron each. Finally, the substrates 14 and 15 are typically made of fused silica, having a thickness of about three millimeters each.

In order to present an initially erased state which is uniform in the liquid crystal 11 (i.e., a "clean initial slate"), the liquid 11 is heated uniformly into the nematic or isotropic state, by means of an auxiliary heater (not shown), such as an auxiliary electrical joule heating layer located on one or both of the exposed surfaces of the substrates 14 and 15 or by passing a heating current through one or both of the electrodes 12 and 13. In case the liquid crystal 11 is CBOA, a temperature in the range above about 65°C is sufficient to produce the nematic state, and a temperature above about 72°C is sufficient for the isotropic state. The liquid crystal 11 is thereafter cooled to the ambient temperature at a rate such that the entire crystal is brought into the ordered smectic texture. For the particular material CBOA, the operating ambient temperature at which the liquid crystal is held (after cooling), in the absence of an external beam incident thereon, should be between about 36°C and 48°C. The plates 14 and 15 are maintained in this ambient temperature range in order to provide the ambient operating temperature.

In order to write a pattern of information into the crystal 11, the laser source 18 advantageously provides a beam 19 having a cross section of approximately 15 microns, such as furnished by a focused 20 milliwatt YAlG infrared laser 18. This beam 19 scans the liquid crystal at a velocity typically of about two centimeters per second. During this scanning, the laser source 18 is directed so that the laser beam 19 selectively scans only those portions of the liquid crystal 11 which are to be written in with the desired pattern of information. Thereby, upon illumination with the readout beam 21, those portions which have been scanned by the laser source 18 will scatter light toward the detector 25 in a significantly greater amount than those portions which have not been scanned by the laser source.

Figure 1:
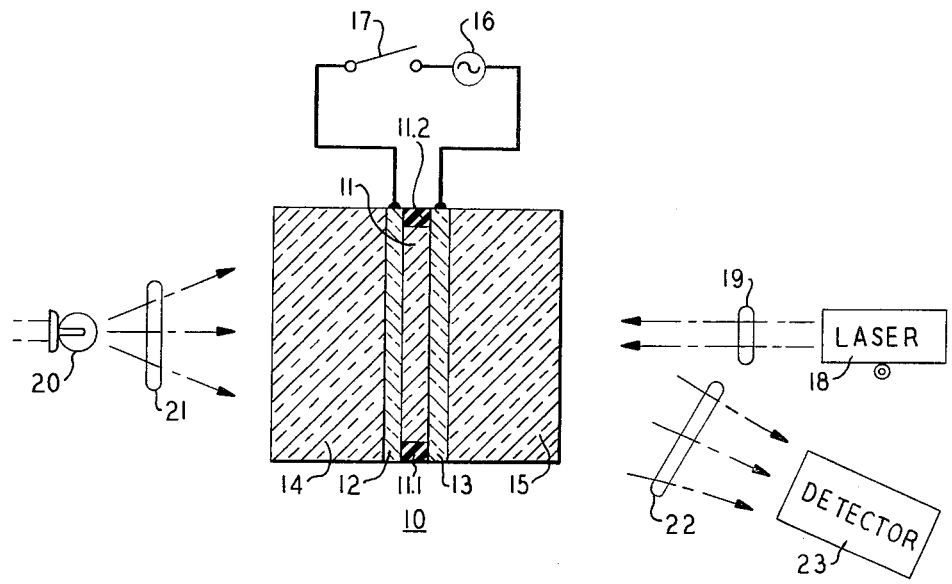
FIG. 1 is a diagram, partly in cross section, of an optical display apparatus, in according with the specific embodiment of this invention.

It should be mentioned that the required laser power from the source 18 can be reduced by closing the switch 17 (FIG. 1) or by suitable control 30 (FIG. 2) during the laser scan, thereby to apply an electric field across the crystal 11 from the source 16. Typically, an AC voltage of about 9 volts RMS at 1.5 KHz is useful for this purpose of reducing the laser scan power needed for effecting the desired change in state of the liquid crystal.

In order to erase locally only certain selected portions of the previously written-in pattern of information, the liquid crystal 11 is subjected to a second scan by the laser source 18 (or by a different laser, not shown), at least at those portions of the crystal at which it is desired to provide the local erase of the previously written portions. Of course, these portions of the crystal which are already in the ordered (nonscattering) smectic texture can also be scanned with the erasing laser scan, and these portions will thereby remain in the desired optical nonscattering texture.

In the erasure it is important that the sweeping rate of the scanning laser beam from the source 18 be significantly slower, and/or of larger cross section (but of the same optical power per unit area), or of larger power per unit area (but of same optical cross section), than during the write-in. Thereby, the cooling rate associated with the erasing scan will be slower than the rate associated with the write-in scan. Alternatively, the switch 17 (FIG. 1) should be closed both during the erase scan with the laser source 18 and during the immediately subsequent cooling, thereby simultaneously applying an AC voltage from the source 16 (of about 35 volts at about 1.5 KHz, for example) across the liquid crystal 11. This application of the electric field from the AC source 16 can also be, of course, synchronized with the erasing laser scan by suitable control 30 (FIG. 2). In this manner, the rate of cooling during the erasure step will be either slower, or the reordering of the liquid crystal molecules will be assisted by an electric field significantly greater, than during the write-in step. Thereby, the portions of the previously written-in regions of the liquid crystal 11 which have been subjected to the second (erase) scan by the laser source 18 will be returned into a non-scattering state by reason of slow cooling of the crystal 11 back to the nonscattering smectic texture, or by reason of the electric field assisting the reordering of the liquid crystal molecules back into the nonscattering smectic texture.

Although the drawing indicates but a single laser source 18, it is obvious that two different laser sources may be used in this invention, one for the write-in and the other for the erasure. Moreover, as known in the art, Schlieren techniques for the projecting of the image pattern of the liquid crystal 11 may be employed. While this invention has been described in detail in terms of a specific example, various modifications can be made without departing from the scope of the invention, as should be obvious to the worker of ordinary skill in the art. For example, other liquid crystals having a smectic molecular ordered state may be found to be useful, and liquid crystals operating in a cholesteric state should similarly be useful.

Whereas the above described coupling agent (Dow Corning XZ 2-2300) in conjunction with the above described crystal molecules (CBOA) results in an alignment of molecules which is perpendicular to the plane of the electrodes, other coupling agents or alignment methods (rubbing, for example) can also be used which result in other alignments of the liquid crystal molecules. However, it should be mentioned that when using a liquid whose alignment is arranged to be perpendicular to the plane of the electrodes, it is desirable that the dielectric anisotropy of the liquid crystal be strongly positive for thermal erase assisted by applied electric fields directed perpendicular to the electrodes, as is the case with CBOA described above. In addition, in order to minimize the possibility of electrical breakdown, the electrode surfaces facing the liquid crystal can be coated with an insulating layer such as silicon dioxide typically of a few hundred angstroms in thickness.

While in the particular example described above, electric field orienting effects on the molecular orientation of the liquid crystal predominate over electric current disorienting effects, by other choices of material having different dielectric anisotropics and electrical conductivities, and by other choices of electric field strengths and AC frequencies, electrical current disorienting effects can also be utilized. Also, instead of the infrared laser beam 19, other means for localized heating can be used, such as incoherent optical sources, electron beams, plasma discharges, or arrays of electrical heaters. Moreover, the liquid crystal 11 can contain other constituents by mixing or substituting CBOA with other substances, in order to achieve a smectic liquid crystal state at different desired ambient temperatures. Finally, instead of utilizing the different optical scattering properties of ordered and disordered textures of the liquid crystal, the different optical polarization properties (such as refractive index) of the liquid crystal with respect to the polarizations of the transmitted light can be utilized in liquid crystal optical display and control devices in this invention.

What is claimed is:

1. The method of storing information in a film which comprises the steps of (a) raising the temperature of a first portion of the film initially at a first ambient temperature; (b) allowing said first portion of the film to cool at a first rate to the ambient temperature; (c) raising the temperature of a second portion of the film including at least a part of the first portion of the film; and (d) allowing the second portion to cool at a second rate to the first ambient temperature, whereby an optical property of the film in the second portion becomes different from said property in the first portion of the film prior to the step (c).

2. The method recited in claim 1 in which the film is a liquid crystal.

3. The method recited in claim 2 in which essentially the entire film is in the smectic state at the ambient temperature prior to the step (a).

4. The method of storing information in a film which comprises the steps of (a) raising the temperature of a first portion of the film initially at a first ambient temperature; (b) cooling said first portion of the film; (c) raising the temperature of a second portion including at least a part of the first portion of the film; and (d) cooling the second portion in the presence of an electric field which is significantly different from any electric field applied to the film during the cooling of the first portion, whereby, an optical property of the film in the second portion becomes different from said property in the first portion of the film prior to the step (c).

5. The method recited in claim 4 in which the film is a liquid crystal.

6. The method recited in claim 5 in which the film is a smectic liquid crystal at the ambient temperature prior to the step (a).

7. An optical information storage device which includes (a) a liquid crystal film; and (b) means for selectively heating the film in succession, including a first and a second beam having first and second cross sections, said beams having first and second scanning rates respectively across the film, in order to heat, respectively, a first portion of the film and a second portion of the film including part or all of the first portion of the film, the scanning rates and cross sections of the beams being selected such that the second portion of the film cools at a different rate than the first portion of the film, whereby an optical property of the film in the second portion becomes different from said property in the second portion of the film in the absence of the second beam.

8. An optical information storage device which includes (a) a liquid crystal film; (b) means for selectively heating the film including first and second beams having first and second cross sections, said beams having first and second scanning rates respectively across the film, in order to heat a first portion of the film and a second portion of the film including part or all of the first portion thereof; (c) a source of electric voltage; and (d) means for applying the electric voltage to the film while applying the first or the second beams, whereby an optical property of the film in the second portion becomes different from said property in the second portion of the film in the absence of the second beam.

9. An optical storage device which includes (a) a liquid crystal at a first temperature under ambient operating conditions; (b) means for heating in succession first and second portions of the crystal, in order to heat said portions to temperatures above the first temperature, the second portion including at least a portion of the first region; and (c) means for applying an electric field to the crystal while the second portion cools to the first temperature, whereby an optical property of the film in the second portion becomes different from said property in the second portion of the film in the absence of the second beam.

10. An optical storage apparatus which includes (a) a liquid crystal in the smectic state at a first ambient temperature; and (b) means for heating a selected portion of the crystal, in order to heat said portion to a temperature sufficient to bring said portion of the crystal into a state other than the smectic state, so that when the said portion cools to the first ambient temperature said second portion has a significantly different optical property from the remainder of the liquid crystal.

* * * * *

UNITED STATES PATENT OFFICE
CERTIFICATE OF CORRECTION

Patent No. 3,796,999         Dated   March 12, 1974

Inventor(s)  FREDERIC JAY KAHN

It is certified that error appears in the above-identified patent and that said Letters Patent are hereby corrected as shown below:

Column 7, line 15, "region" should read -- portion -- .

Column 8, line 4, "second beam" should read -- electric field -- .

Signed and sealed this 13th day of August 1974.

(SEAL)
Attest:

McCOY M. GIBSON, JR.           C. MARSHALL DANN
Attesting Officer              Commissioner of Patents